United States Patent [19]

Terry et al.

[11] Patent Number: 5,021,282

[45] Date of Patent: * Jun. 4, 1991

[54] HONEYCOMB TABLE MANUFACTURE AND CLEAN-ROOM COMPATIBLE HONEYCOMB TABLES

[75] Inventors: Dennis C. Terry, Costa Mesa; Waldemiro M. Filho, Laguna Hills; John J. Turechek, Glendale, all of Calif.

[73] Assignee: Newport Corporation, Fountain Valley, Calif.

[*] Notice: The portion of the term of this patent subsequent to Nov. 4, 2003 has been disclaimed.

[21] Appl. No.: 336,893

[22] Filed: Apr. 12, 1989

Related U.S. Application Data

[60] Division of Ser. No. 148,592, Jan. 26, 1988, Pat. No. 4,853,065, which is a continuation-in-part of Ser. No. 890,632, Jul. 30, 1986, abandoned, which is a continuation-in-part of Ser. No. 663,343, Oct. 22, 1984, Pat. No. 4,621,006.

[51] Int. Cl.⁵ .............................................. B32B 3/12
[52] U.S. Cl. .................................... 428/116; 156/292; 248/637; 428/131; 428/138
[58] Field of Search ................ 156/197, 292; 248/637; 428/116, 117, 118, 131, 138

[56] References Cited

U.S. PATENT DOCUMENTS

| | | | |
|---|---|---|---|
| 2,870,857 | 1/1959 | Goldstein | 428/116 X |
| 3,070,480 | 12/1962 | Breiner | 428/116 |
| 3,087,565 | 4/1963 | Kerwin, Jr. | 428/116 X |
| 3,087,571 | 4/1963 | Kerwin, Jr. | 428/116 X |
| 3,104,194 | 9/1963 | Zahorski | 428/116 |
| 3,137,604 | 6/1964 | Bosch | 428/116 X |
| 3,176,662 | 4/1965 | Williams | 211/60.1 X |
| 3,249,659 | 5/1966 | Voelker | 428/117 X |
| 3,456,806 | 7/1969 | Borston | 211/60.1 |
| 3,601,343 | 8/1971 | Sivaslian | 248/467 X |
| 3,606,460 | 9/1971 | Shannon | 297/422 X |
| 3,754,812 | 8/1973 | Mohn | 428/116 X |
| 3,765,993 | 10/1973 | Raffensparger et al. | 428/116 X |
| 3,784,146 | 1/1974 | Matthews | 248/562 |
| 3,836,416 | 9/1974 | Ropiequet | 156/176 X |

(List continued on next page.)

FOREIGN PATENT DOCUMENTS 836401 4/1952 Fed. Rep. of Germany ...... 428/131

OTHER PUBLICATIONS

*Mechanical Properties of Hexcel Honeycomb Materials*, TSB 120, by Hexcel Corporation (1982 Revision).
*The Basics on Bonded Sandwich Construction*, TSB 124, by Hexcel Corporation (1982 Revision).
*Optical Hardware*, by Melles Griot (1983), pp. 2 to 6.
*Photonics*, by Technical Manufacturing Corp., of Peabody, MA 01960; Oct. 1985 and Jan. 1986.
*Lasers & Applications*, by Technical Manufacturing Corp., of Peabody MA 01960, Sep. 1985.
The Newport Catalog, No. 100, 1987.

Primary Examiner—Henry F. Epstein
Attorney, Agent, or Firm—Benoit Law Corporation

[57] ABSTRACT

In order to render honeycomb tables with apertured table leaves clean-room compatible, sealing sheets are provided with projections corresponding in number and location to apertures in the table leaves and projecting into cells of honeycomb cores for a distance being several times smaller than the depth of such cores. These sealing sheets and their projections seal the honeycomb cells against the table leaf apertures inside the table leaves. Debris and lubricant residues accumulate inside these projections during provision of the table leaf apertures and are removed through these apertures preparatory to use of each honeycomb table in a clean room. The apertures are structured for receiving fasteners for attaching objects to the honeycomb tables. A load-bearing sealing structure may be molded from a sealing sheet or may otherwise be provided with cavities situated like the above mentioned projections. Sitting on top of the honeycomb core, that sealing structure bears the table leaf and objects or other loads placed or imposed on the table, in addition to ensuring clean-room compatibility.

46 Claims, 6 Drawing Sheets

U.S. PATENT DOCUMENTS

| | | | |
|---|---|---|---|
| 4,035,061 | 7/1977 | Sheridon | 350/360 |
| 4,066,249 | 1/1978 | Huber et al. | 269/21 |
| 4,182,553 | 1/1980 | Sheridon | 350/336 |
| 4,221,014 | 9/1980 | Davidson | 211/60.1 X |
| 4,241,892 | 12/1980 | Morris | 156/253 X |
| 4,294,329 | 10/1981 | Rose et al. | 428/116 X |
| 4,300,978 | 11/1981 | Whitemore et al. | 428/116 X |
| 4,360,184 | 11/1982 | Reid, III | 248/583 X |
| 4,370,372 | 1/1983 | Higgins et al. | 428/116 |
| 4,465,725 | 8/1984 | Riel | 52/806 X |
| 4,621,006 | 11/1986 | Terry et al. | 428/116 X |
| 4,645,171 | 2/1987 | Heide | 428/116 X |
| 4,666,748 | 5/1987 | Rinkewich | 428/12 |
| 4,853,065 | 8/1989 | Terry et al. | 428/116 X |
| 4,913,953 | 4/1990 | Prewo et al. | 428/138 X |

HONEYCOMB TABLE MANUFACTURE AND CLEAN-ROOM COMPATIBLE HONEYCOMB TABLES

BACKGROUND OF THE INVENTION

CROSS-REFERENCE TO RELATED APPLICATION

This is a division of patent application Ser. No. 07/148,592, filed Jan. 26, 1988, now U.S. Pat. No. 4,853,065, by Dennis C. Terry et al, which is a continuation-in-part of U.S. Pat. No. 06/890,632, filed July 30, 1986 by Dennis C. Terry et al and now abandoned, which is a continuation-in-part of U.S. Pat. No. 06/663,343, filed Oct. 22, 1984 by Dennis C. Terry et al, assigned to the common assignee, herewith incorporated by reference herein, and issued as U.S. Pat. No. 4,621,006, on Nov. 4, 1986.

FIELD OF THE INVENTION

The subject invention relates to honeycomb panels and tables, honeycomb panel and table manufacture, and optical tables including honeycomb and similar structures.

INFORMATION DISCLOSURE STATEMENT

This information disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments subsequent in time or priority.

Utility and advantages of honeycomb structures, panels and tables in various fields of technology are well known, as may, for instance, be seen from U.S. Pat. Nos. 3,784,146 by J. W. Matthews, issued Jan. 8, 1974 for a horizontal vibration isolation system, 4,360,184 by W. J. Reid, III, issued Nov. 23, 1982 for a pneumatic device for attenuation of vertical, horizontal and rotational dynamic forces, 3,606,460, by M. J. Shannon, issued Sept. 20, 1971 and disclosing furniture and table construction with honeycomb panels, 3,754,812, by H. Mohn, issued Aug. 28, 1973 and disclosing optical elements with honeycomb support plate, 3,765,993, by S. L. Raffensparger et al, issued Oct. 16, 1973 and disclosing a layup machine for assembling honeycomb core panels, 4,035,061, issued July 12, 1977 and 4,182,553, issued Jan. 8, 1980, by N. K. Sheridon, disclosing honeycomb display devices, and 4,066,249, by J. G. Huber, issued Jan. 3, 1978 and disclosing a modular vacuum work area with honeycomb core; all being herewith incorporated by reference herein.

Reference may also be had to U.S. Pat. Nos. 3,070,480, by R. C. Breiner, issued Dec. 25, 1962, and 3,104,194, by A. T. Zahorski, issued Sept. 17, 1963, both of which show honeycomb panels having corrugated sheets interposed between the honeycomb cores and outer panel sheets, and U.S. Pat. Nos. 3,087,565 and 3,087,571, by E. M. Kerwin, Jr., issued Apr. 30, 1963 for apparatus for damping flexural movements.

Reference may also be had to brochures entitled *Mechanical Properties of Hexcel Honeycomb Materials*, TSB 120, and *The Basics on Bonded Sandwich Construction*, TSB 124, by Hexcel Corporation (1982 Revision).

For an extensive tutorial discussion on optical honeycomb tables, reference may be had to the 1983-1984 Catalog by the subject assignee, Newport Corporation, pp. 3 et seq., 2nd Edition, including discussion of the multilevel panel systems on pages 40 and 41 thereof.

In this respect, by way of example and not by way of limitation, among the most sensitive applications to which optical tables are put are those involving interferometry, where tolerable relative displacements of reflective elements are measured in fractions of a micron and allowable table top bending or twisting is typically much less than a second of arc.

Even when requirements are less demanding, it is best to choose a table system that offers that kind of performance, thereby eliminating any likelihood of table related problems.

The rigidity of a panel or table used in optical research is one of the primary performance features and, for a given panel thickness and skin, depends largely on the shear modulus of the core.

For these and related reasons, honeycomb cores are greatly preferred for very stable panel and table systems.

In the past, granite plates and slabs were frequently used in laser holography and interferometry work. However, while granite offers great stability, the lack of a generally acceptable means of securing components to granite surfaces, as well as the great weight of granite slabs, is increasingly displacing them from laboratories and similar environments.

A major advantage of honeycomb panels or tables is that their top skin or table leaf can be provided with a large number of mounting holes which have a very minor effect on panel or table rigidity and strength. Typically, such mounting holes are present in great number and are tapped, thereby permitting the mounting of optical instruments and other components in a wide variety of desired locations.

In some applications, the drilling and tapping of holes in the panel or table top skin leaves residues in the cells of the honeycomb core. Where the honeycomb cores have to be very thick between top and bottom skins for high rigidity and stability, contaminants in the honeycomb cells are sometimes difficult to remove.

Reference may in this respect be had to U.S. Pat. No. 3,137,604, by L. R. Bosch, issued June 16, 1964 for a honeycomb structure and process of manufacture, but failing to suggest any solution to the latter problem.

The same applies to the proposal according to U.S. Pat. No. 4,370,372, by W. E. Higgins et al, issued Jan. 25, 1983 for a method of joining honeycomb panels using a fastener element, and to the proposal according to U.S. Pat. No. 3,249,659, by W. D. Voelker, issued May 3, 1966 for a method of making laminated panel structures in which perforations are provided in reinforcing members between internal cells.

Efforts of providing honeycomb panels in non-analogous areas have worked against, rather than for, a solution, issued Jan. 27, 1959 for a translucent acoustical correction ceiling construction, U.S. Pat. No. 4,294,329, by P. M. Rose et al, issued Oct. 13, 1981 for a double layer attenuation panel, U.S. Pat. No. 4,300,978, by C. E. Whitemore et al, issued Nov. 17, 1981 for a bonding tool for venting honeycomb noise attenuation structures, and U.S. Pat. No. 4,465,725, by F. J. Riel, issued Aug. 14, 1984 for another noise suppression panel.

These proposals teach preservation of internal flow-through capability between internal honeycomb cells in addition to flow-through to the panel environment, which is just the opposite of what would be needed for clean-room compatibility after contamination of cells during manufacture of the panels.

This, then, can cause problems in clean-room, vacuum and other environments where contaminants are able to leave honeycomb cells through apertures in the top skin to an extent producing a noticeable effect in the particular environment.

In this respect, it has been claimed that the use of threaded inserts in lieu of tapped top skin holes avoids the use of oil that could affect delicate optical opponents. Reference may in this respect be had to the brochure entitled *Optical Hardware*, by Melles Griot (1983), pp. 2 to 6. Among the problems of that approach is, of course, the fact that even a medium sized table of, say, four feet by six feet size, requires over three thousand threaded inserts which have to be individually positioned and attached to the top skin, if mounting holes one inch apart are to be provided in the table top.

Another approach would be to close each tapped mounting hole with a threaded stud, before the honeycomb panel or table is put into service. This, too, would require the use and insertion of thousands of studs in practical applications and, moreover, would, of course, only seal off, but not remove, oil and other drilling and tapping residues from honeycomb cells.

According to advertisements by Technical Manufacturing Corp., of Peabody, MA 01960, which have appeared in *Photonics*, October 1985 and January 1986, and in *Lasers & Applications*, September 1985, the tapped holes in the vibration isolation table leaf are individually equipped with metal cups projecting into the honeycomb table cells. In the words of the advertisers, every threaded hole in the top surface is enclosed from below with a welded and epoxy-sealed metal cup, and no inserts are used. That is believed to be a rather cumbersome and expensive procedure. Also, those cups do not appear to impart a beneficial structural or dynamic effect to the vibration isolation performance of the table.

This is confirmed in U.S. Pat. No. 4,645,171, by Ulf B. Heide, issued Feb. 24, 1987 to Technical Manufacturing Corporation, and being expressly limited to non load bearing enclosures. References cited in that patent include U.S. Pat. Nos. 3,176,662, by R. E. Williams, issued Apr. 6, 1965 for an illustrator's pen holder desk set and components therefor, 3,456,806, by S. M. Borston, issued July 22, 1969, for a hair curler stand, 3,601,343, by A. H. Sivaslian, issued Aug. 24, 1971, for a strain-free mount having beamlike support elements, 3,836,416, by R. L. Ropiequet, issued Sept. 17, 1974, for non-woven thermoplastic fabrics including filaments extruded through orifices in the die of an extrusion chamber, 4,221,014, by S. L. Davidson, issued Sept. 9, 1980, for a post storage rack having openings in a support plate for drainage and for accommodation of projecting post ends, 4,241,892, by I. B. Morris, issued Dec. 30, 1980, for an appliance skidboard having top and bottom perforations, and Federal Republic of Germany Patent 836 401, by Wilhelm Dichmann II, issued Apr. 10, 1952, for a method and table for retaining papers, cardboard, plywood, metal foil, and the like, having an apertured table top on a vacuum chamber.

None of these references suggest a solution for the problem at hand.

On the other hand, the common assignee hereof, as shown in the above mentioned parent U.S. Pat. No. 4,621,006, has provided clean-room compatible table systems which are relatively easy to manufacture, but are very effective in practice.

Reference may in this respect be had to the above mentioned Second Edition of the Newport Corporation 1983–1984 Catalog, including p.32, second paragraph, and generally to The Newport Catalog No. 100, published 1987, and particularly to section A thereof, on Vibration-Isolated Table Systems.

SUMMARY OF THE INVENTION

It is a general object of this invention to overcome disadvantages or meet needs expressed or implicit in the Information Disclosure Statement or in other parts hereof.

It is a related object of this invention to provide improved honeycomb panels and tables, hereinafter simply referred to as "honeycomb tables."

It is a germane object of this invention to provide new or improved methods of manufacturing honeycomb tables.

It is also an object of this invention to render honeycomb tables clean-room compatible.

It is a related object of this invention to improve the ease of manufacture of clean-room compatible honeycomb tables.

It is also an object of this invention to improve mechanical performance of honeycomb tables while providing clean-room compatibility.

Other objects of this invention will become apparent in the further course of this disclosure.

From one aspect thereof, the subject invention resides in a method of manufacturing a honeycomb table including a table leaf having an outside surface and apertures for receiving fasteners for attaching objects at that outside surface and including a honeycomb core supporting that table leaf and extending inside that table leaf between that table leaf and a facing sheet spaced from that table leaf and having internal cells. The invention according to this aspect resides, more specifically, in the improvement comprising in combination the steps of providing a sealing sheet with projections corresponding in number and location at least to the above mentioned apertures for projection from the table leaf for a distance being smaller than a spacing between the above mentioned facing sheet and the table leaf, and providing the sealing sheet between the table leaf and the honeycomb core for sealing the internal cells of the honeycomb core relative to the apertures in the table leaf; with the projections of the sealing sheet projecting away from the table leaf and the apertures in said table leaf communicating with insides of the projections to render the honeycomb table clean-room compatible by enabling cleaning of the projections of the sealing sheet inside the table leaf through its apertures from outside of that table leaf.

From a related aspect thereof, the subject invention provides a load-bearing sealing structure with cavities corresponding in number and location at least to the table apertures and with a height smaller than a spacing between the facing sheet and the table leaf. The invention interposes that sealing structure between the table leaf and the honeycomb core so that such sealing structure bears the table leaf and loads imposed on said table leaf and so that this sealing structure seals the internal cells of the above mentioned honeycomb core relative to the above mentioned apertures in the table leaf. Apertures in the table leaf are caused to communicate with cavities in the sealing structure to render the honeycomb table clean-room compatible by enabling cleaning of these cavities inside the table leaf through the apertures from outside the table leaf.

From a related aspect thereof, the subject invention also resides in a honeycomb table, comprising in combination, a table leaf having an outside surface and apertures for receiving fasteners for attaching objects at that outside surface, means for rendering the honeycomb table clean-room compatible, including a sealing sheet having projections corresponding in number and location at least to the above mentioned apertures and extending from an inside of the table leaf for a first distance, a facing sheet spaced from the table leaf, and a honeycomb core supporting the sealing sheet and the table leaf and extending between that sealing sheet and the above mentioned facing sheet for a second distance being larger than the first distance and having internal cells between the sealing sheet and the facing sheet sealed off against the apertures by the sealing sheet.

From a related further aspect thereof, the subject invention also resides in a honeycomb table, comprising, in combination, a table leaf having an outside surface and apertures for receiving fasteners for attaching objects at that outside surface, means for rendering the honeycomb table clean-room compatible, including a sealing sheet having projections corresponding in number and location at least to the apertures and extending from an inside of the table leaf, a facing sheet spaced from the table leaf, and a honeycomb core supporting the sealing sheet and having first elements between bottoms of the projections and the facing sheet, and second elements interconnected with the first elements and extending along the first elements and in between the projections.

Other aspects of the invention will become apparent from this disclosure, and no restriction to any aspect or invention is intended by this Summary of the Invention.

No restriction to any particular sequence is intended by any recital of steps in any method claim or in any description of any method herein.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts and in which.

DESCRIPTION OF PREFERRED EMBODIMENTS

Figures 1, 2:
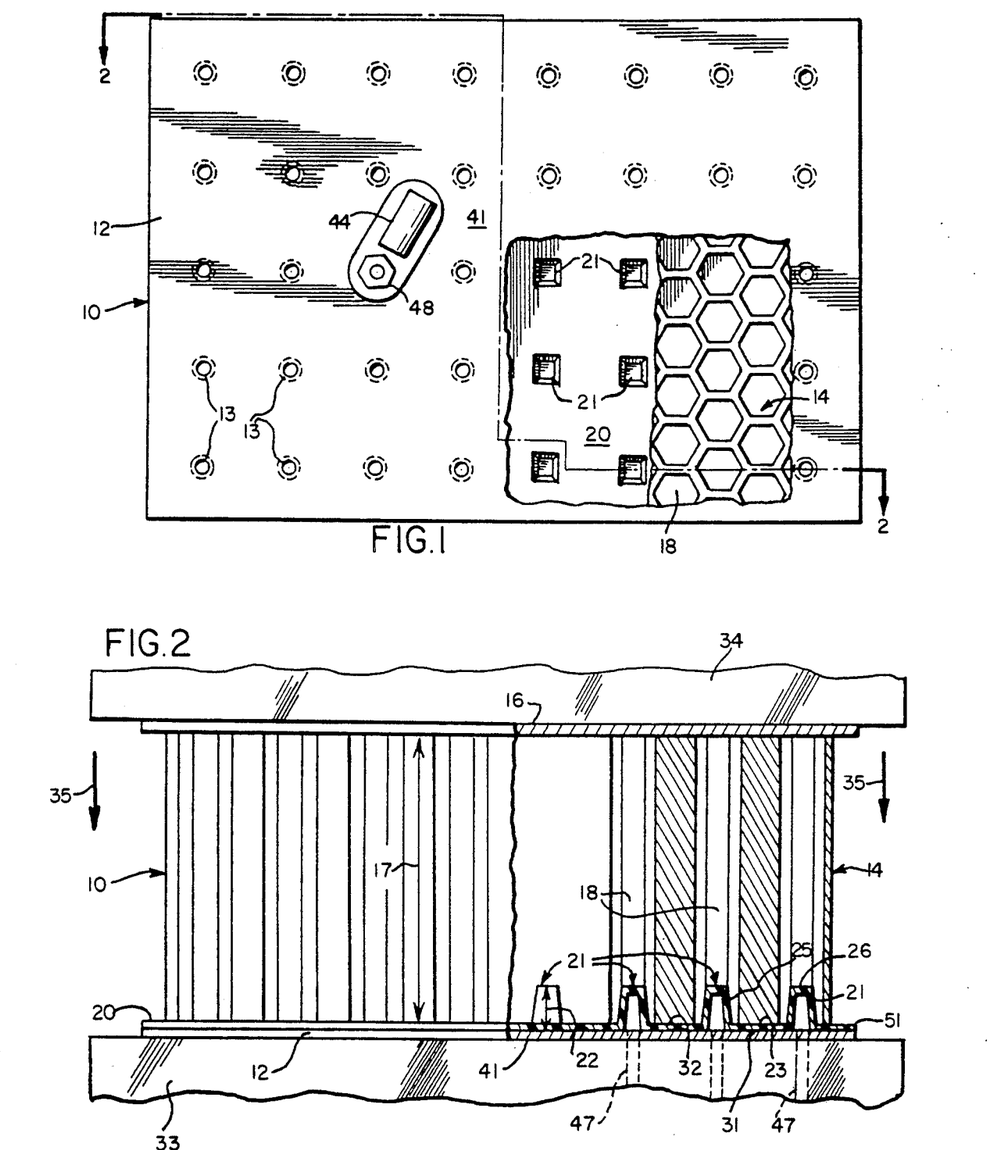
FIG. 1 is a top view of a honeycomb table, having parts broken away to disclose internal structure according to an embodiment of the subject invention.
FIG. 2 is an elevation of part of a honeycomb table during a phase of its manufacture according to an embodiment of the subject invention.

The honeycomb table 10 whose top view is shown in FIG. 1 has a top skin or leaf 12, herein for brevity referred to as "table leaf." The subject invention has utility in the manufacture of various honeycomb breadboards, panels, tables and similar structures, herein for brevity referred to as "honeycomb tables."

In practice, honeycomb tables of the type herein disclosed are frequently used with other components and structures, such as in or with vibration isolation systems, as may be seen from the above mentioned Newport Corporation 1983-84 Catalog and from U.S. Pat. No. 3,784,146, by John W. Matthews, Ph.D., issued Jan. 8, 1974 and herewith incorporated by reference herein.

The table leaf 12 is apertured, having a multitude of threaded or tapped mounting holes 13 therethrough, for an attachment of various optical and other components used on the honeycomb table for experimentation, research and development, or for industrial analysis, design and testing or a great variety of other purposes. While only a limited number of apertures 13 are shown in FIG. 1, an actual honeycomb table for optical purposes typically has thousands of tapped mounting holes arranged in a regular grid pattern in parallel to the length and the width of the table.

The honeycomb table 10 has a honeycomb core 14 extending between and supporting the apertured table leaf 12 and a bottom or facing sheet 16 spaced from the table leaf 12 by a first distance 17. The honeycomb core 14 has internal cells 18 extending between the table leaf 12 and the facing sheet 16. In the context of the subject invention, this does not mean that the honeycomb cells 18 extend onto the table leaf 12 to communicate with apertures 13 in the table leaf. Rather, the honeycomb cells are sealed off, as more fully set-forth in the further course of this disclosure.

In the manufacturing method and construction shown in FIGS. 1 to 4, the illustrated preferred embodiment of the subject invention renders the honeycomb table 10 clean-room compatible by sealing the cells 18 with a sealing sheet 20 having projections 21 projecting from the table leaf 12 by a second distance 22 several times smaller than the first distance 17.

The honeycomb core 14 may be manufactured in a conventional manner. By way of example, the above mentioned brochure TSB 120 describes and illustrates on pages 2 thereof the well-known expansion process of honeycomb manufacture, as well as the equally well-known corrugation process. In this respect, the expression "honeycomb" as herein employed and as generally used in industry is not restricted to exact hexagonal configurations. Rather, that expression is generally also applied to core configuration composed of corrugated sheets that form cells of other than hexagonal cross-section.

Figure 14:
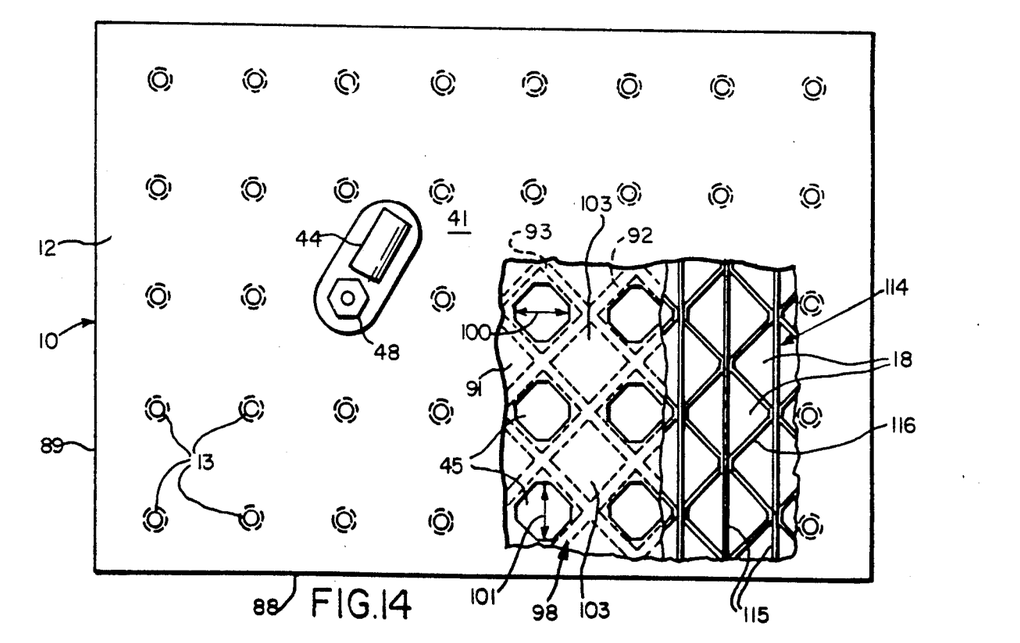
FIG. 14 is a view similar to FIGS. 1 and 9 showing yet another embodiment of the invention.

Of course, those skilled in the art will select the best cell or core configuration for a given application For instance, if highest precision is essential, cheap substitutes are to be avoided, as the above mentioned Newport Corporation 1983–84 Catalog points out on page 4 thereof under the subtitle "Pseudo Honeycomb Panels." Nevertheless, corrugated sheets glued together at their crests may be suitable in high-performance honeycomb cores. This is illustrated in FIG. 14 by way of example, where a honeycomb core 114 is shown as composed of longitudinal ribs or panels 115 and corrugated sheets or panels 116 interdigitated therewith and mounted thereon to provide the internal or honeycomb cells 18 sealed off pursuant to the subject invention.

Various materials used in the manufacture of honeycomb structures may also be employed in the practice of the subject invention. For instance, the honeycomb core 14 may be made from an aluminum alloy, from steel or of plastic material, to name a few examples.

The illustrated preferred embodiment of the invention resides in a method of manufacturing a honeycomb table 10 including a table leaf 12 having an outside surface and apertures 13 for receiving fasteners 48 for attaching objects 44 at that outside surface 41 and including a honeycomb core 14 supporting the table leaf and extending inside that table leaf between that table leaf 12 and a facing sheet spaced 16 from the table leaf and having internal cells coinciding spatially with the apertures 13. Not all of the cells 18 need to coincide with an aperture. Some of the honeycomb cells may be located between apertures 13.

However, the sealing sheet 20 is provided with projections 21 corresponding in number and location to the apertures 13 for projection from the table leaf 12 for a distance 22 being several times smaller than a spacing 17 between the facing sheet 16 and the table leaf 12. In particular, the sealing sheet 20 is provided between the table leaf 12 and the honeycomb core 14 with the projections 21 projecting away from the table leaf 12 into the cells 18.

The apertures 13 may then be provided in the table leaf 12 as communicating with insides of the projections 21. The honeycomb table may thereafter be rendered clean-room compatible by cleaning the projections 21 inside the table leaf through the apertures 13 from outside of that table leaf 13.

Figure 6:
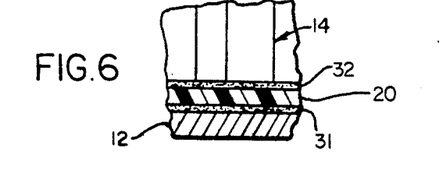
FIG. 6 is a detail view, on an enlarged scale, of part of the honeycomb table shown in FIGS. 1 to 4.

For attachment of the sealing sheet 20 to the table leaf 12 and of the honeycomb structure 14 to the sealing sheet, or vice versa, during any suitable and desired phase of the table assembly, reference may be had to FIG. 6, in addition to FIG. 2, for instance.

The sealing sheet 20 and the table leaf 12 are attached to each other with an adhesive 31 applied to that sealing sheet and to an inside surface 51 of the table leaf, opposite the outside 41. The sealing sheet 20 and the honeycomb core 14 are attached to each other with an adhesive 32 applied to that sealing sheet 20 and to the honeycomb core 14.

The above mentioned brochures TSB 120 and 124 contain tutorial comments on adhesives preferred for such purposes.

The sealing sheet 20 and the honeycomb core 14 are attached to each other at portions 23 of the sealing sheet 20 between its projections 21. Similarly, the sealing sheet and the table leaf 12 are attached to each other at the portions 23 of the sealing sheet between its projections 21.

The sealing sheet 20 preferably is used as an intermediary in an attachment of the honeycomb core 14 to the table leaf 12.

According to the illustrated preferred embodiment of the invention, the projections 21 are sealed except for communication through the apertures 13. By way of example, the projections 21 are provided with closed sides 25 and closed bottoms 26 relative to the honeycomb core 14 or internal cells 18.

Figure 5:
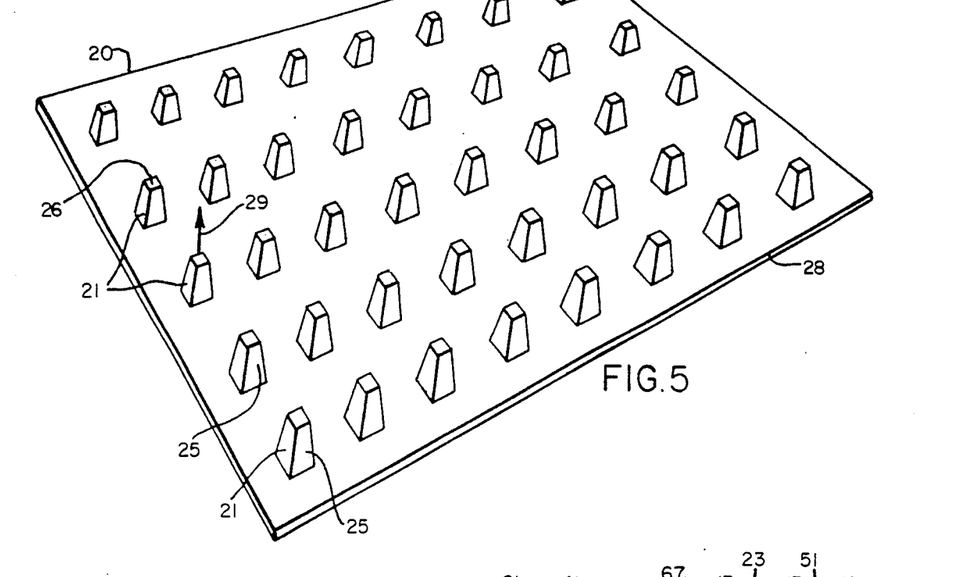
FIG. 5 is a perspective view of a sealing sheet made according to an embodiment of the subject invention.

As diagrammatically indicated in FIG. 5, the sealing sheet 20 may be made by providing a sheet of sealing material 28 and providing the sealing sheet with the projections 21 by drawing these projections in said sheet of sealing material 28, as symbolically indicated by arrow 29. Stamping or preferably vacuum forming may be used for this purpose.

Various materials, including metal, such as steel and aluminum, and formable plastics, may be used for making and forming the sheet 20, as long as the resulting sheet structure 20, 21 is sufficiently tight to prevent contamination of the honeycomb cells 18 during the provision of the apertures 13 and to preclude any contaminant that may be in the cells 18 from escaping through the apertures 13 when the table 10 is located in a clean room.

Within the scope of the subject invention, the projections 21 and cells 18 may have like or similar cross-sectional configurations. However, according to a preferred embodiment of the invention, the internal cells 18 have a first cross-sectional configuration, and the projections 21 project into these internal cells, but have a second cross-sectional configuration different from that first configuration. This permits the honeycomb core 14 to be structured for its best performance, while permitting optimum structuring of the sealing sheet 20 and projections 21 for their best mechanical and dynamic performance in the context of the honeycomb table system In this respect, the structuring of the sheet and projection system 20, 21 may combine with the structuring of the table leaf and honeycomb system 12, 14, 16 for optimum overall performance in the use of the resulting table system in research, development, testing and other functions.

Accordingly, where the internal cells 18 have a hexagonal configuration, the projections 21 which project into these internal cells preferably have a cross-sectional configuration different from a hexagonal configuration.

Figure 3:
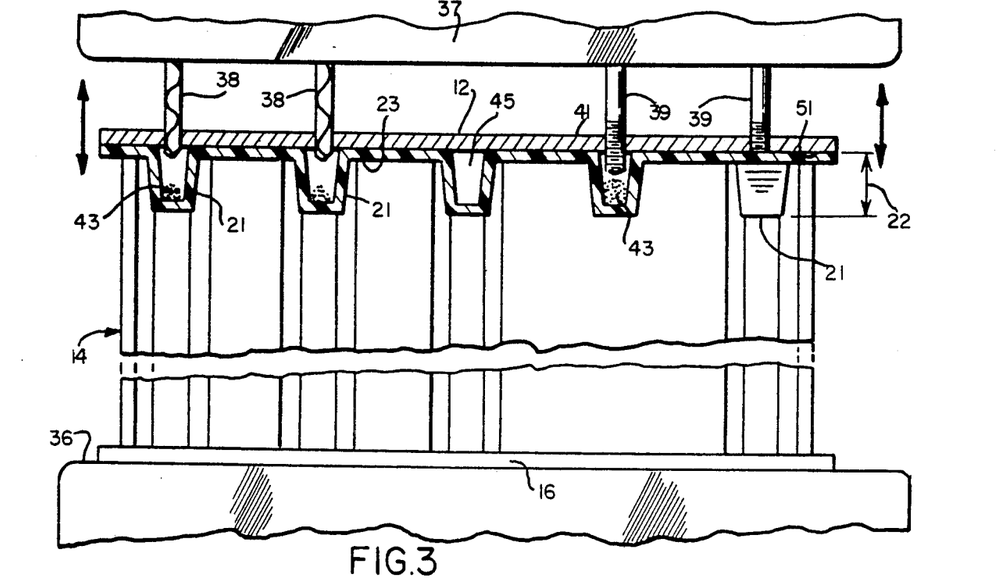
FIG. 3 is a side view of the honeycomb table part of FIG. 2 on a somewhat enlarged scale and illustrates a further phase of the manufacture of the honeycomb table according to an embodiment of the subject invention.

By way of example, the projections 21 may be provided with a rectangular configuration. On the other hand, the side view of the solidly illustrated projection 21 in FIG. 2 and the side view of the solidly illustrated projection 21 in FIG. 3 may be taken as an illustration of a truncated cone or of the fusto-conical configuration mentioned in the next paragraph hereof. In either case, FIGS. 2 and 3 show, that the projections 21 or the cavities 45 may be provided with a gradual diminution of diameter or taper away from the table leaf inside.

According to the illustrated preferred embodiment, the projections 21 are truncately pyramidal; that is, in the form of truncated pyramids. Other options include fustoconical configurations. In either case, the flat tops 26 of the projections 21 are in a plane spaced from the inside surface 51 of the table leaf 12 by the short distance 22.

The honeycomb core 14 supporting the sealing sheet 20 and the table leaf 12 extends between that sealing sheet and the facing sheet 16 for a distance 17 being several times larger than the latter distance 22 and has its internal cells 18 between the sealing sheet and the facing sheet sealed off against the apertures 13 by that sealing sheet 20, including its projections 21, which project into the internal cells 18 and which are sealed except for communication through the apertures 13 in the table top.

The table leaf 12 is preferably pulled flat on the vacuum table 33 after the sealing sheet 20 has been attached to that table leaf 12. The honeycomb core 14 may then be bonded to the sealing sheet 20 or to portions 23 thereof. As shown in FIG. 2, a flat plate 34 resting on the facing sheet 16 and applying a bonding force in the direction of arrows 35, may be employed in conjunction with the vacuum table 33 in bonding the honeycomb section 14 with attached facing sheet 16 to the sealing sheet 20 at portions 23.

That sealing sheet 20 may thus be employed as an intermediary for bonding the table leaf 12 and the honeycomb sections 14 to each other. According to the embodiment shown in FIG. 2, the table leaf 14, sheet 20 and honeycomb section 14 are bonded together before the apertures 13 are drilled into the table leaf 12.

Once the cells 18 of the honeycomb structure have been sealed off by the sealing sheet 20, the apertures 13 may be provided in the embodiment of FIGS. 2 and 3. As shown in FIG. 3, the honeycomb structure 14 with attached sealing sheet 20, table leaf 12 and facing sheet 16 may be inverted relative to the position shown in FIG. 2 and may be placed on a worktable 36. A machine tool 37 may then be employed to first drill and then tap the apertures 13, row by row across and along the table leaf 12.

In practice, a series of drills, followed by a series of tapping bits is employed to this end. For the purpose of illustration, FIG. 3 shows drills 38 on the left-hand side and tapping bits 39 on the right-hand side thereof.

As indicated at 43 in FIG. 3, drilling and tapping of the apertures 13 leaves a certain residue in the honeycomb cells. By way of example, that residue may be composed of a cutting oil or other medium used in the making of the tapped apertures, as well as particles of the metal or other material from which the table leaf 12 is made.

Figure 4:
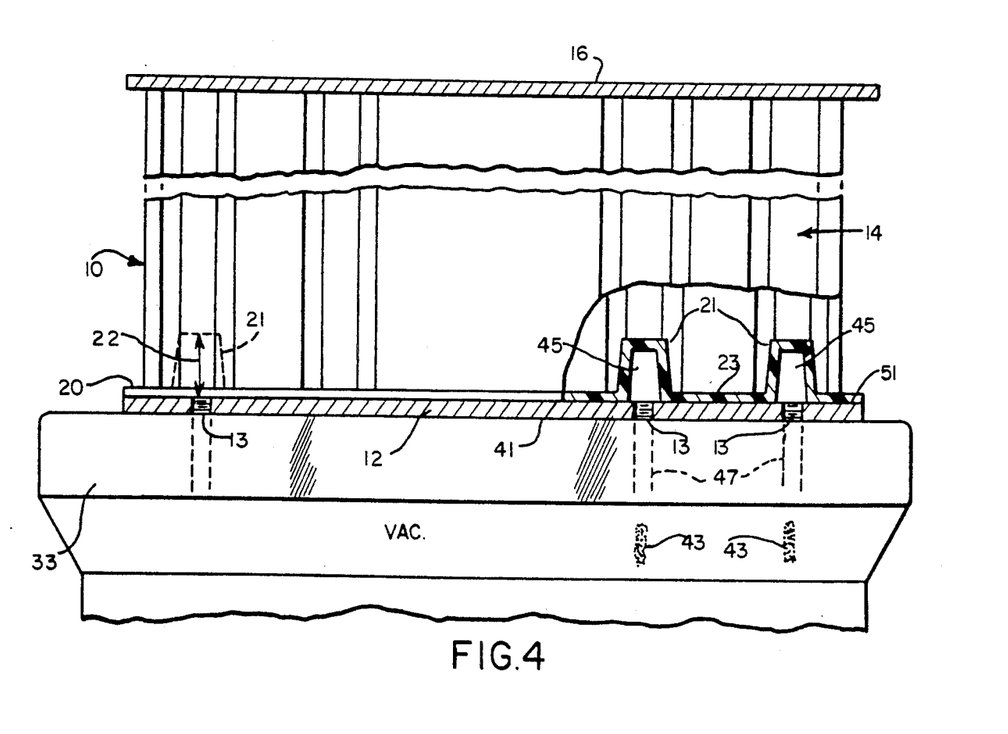
FIG. 4 is a view similar to FIG. 3, illustrating yet another phase in the manufacture of the honeycomb table according to the latter embodiment of the subject invention.

Within the scope of the subject invention, the drilling, tapping and cleaning steps shown in FIGS. 3 and 4 may be carried out before the sealing sheet 20 with attached apertured table leaf 12 is bonded to the honeycomb section or core 14. In that respect, no limitation to a certain sequence of steps is intended by listing certain steps in sequence in any method claim hereof. Rather, within the intended scope of the claimed methods, apertures 13 can be provided in the table leaf before or after the honeycomb section 14 is attached to the sealing sheet 20.

In either case the honeycomb table 10 is rendered clean-room proof by cleaning the projection insides 45 through apertures 13 in the apertured table leaf prior to use of the table in a clean room or even prior to bonding of the honeycomb core section 14 to the sealing sheet 20 and the table leaf 12 combination. Forced flushing, such as with a cleaning liquid, may be employed.

It may be noted that the sealing sheet 20 provides the insides or cavities in its projections 21 and that like or similar cavities 45 are provided in or by the other load-bearing sealing structure of FIGS. 9 to 14.

If the cells of the honeycomb structure 14, extending all the way from the bottom sheet 16, communicated with the apertures 13, then it would be practically impossible with thick table structures to remove all possible contaminants from such elongate cells 18. However, the sealed-off shallow spaces 45 in the small cup-like projections 21 are readily cleaned without great problems.

By way of example and as illustrated in FIG. 4, the table leaf 10 and sealing sheet 20 combination, with or without honeycomb core 14 and facing sheet 16 section, is inverted and placed on the vacuum table 33, and the residues or contaminants 43 are readily removed from the shallow cups 21 or cavities 45 through the tapped apertures 13. For instance, the residues 45 may be pulled with the aid of a vacuum through channels 47 of the vacuum table 33.

The table structure may be finished in a conventional manner by encasing it in an appropriate frame. Damping media may be added as desired. The finished table structure may once more be subjected to the cell cleaning process shown in FIG. 4 before it leaves the plant. If desired, the entire cell cleaning operation could be performed only after the table 10 has otherwise been completely finished.

According to the best mode currently contemplated for carrying out the subject invention, the sealing sheet 20 has base portions 23 attached to the inside 51 of the table leaf 12 and has cups or projections 21 integral with, and projecting from, these base portions. The integral cups 21 thus project away from the table leaf 12 at locations where the fastening apertures 13 are or are to be located. The cups 21 also project into the cells 18 for sealing the internal cells against the apertures 13 inside the table leaf 12 or inside the honeycomb table 10 for that matter.

As disclosed in or in connection with FIG. 2, the means for attaching the sealing sheet sections 23 include an adhesive 31 on corresponding portions of the inside surface 51 of the table leaf 12.

The projection or cups 21 are shallow relative to the cells 18, but still deep enough as not to interfere with the normal operation of the honeycomb table. For instance, if fastening bolts 48 are threaded into the apertures 13, then the otherwise shallow cups 21 preferably are somewhat longer than these bolts, if their length exceeds the thickness of the table leaf 12. Accordingly, even if the bolt exceeds such thickness, the optical or other component 44 still can readily be attached to the table leaf 12, since the bolt will then be accommodated within the sealing sheet projections 21. This will not have an adverse effect at that point, since no contaminant is introduced into the honeycomb cells thereby.

Also, it is much easier to clean the cavities 45 through the apertures 13 at any time, than it would be if the depth of the internal cells 18 would have to be cleaned, if that were possible in practice.

Figure 7:
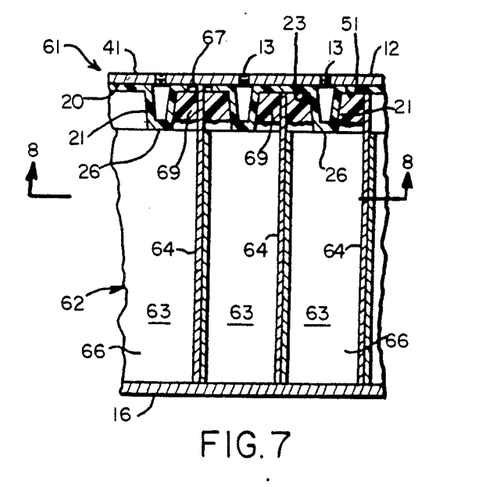
FIG. 7 is a section, with parts broken away, and taken on the line 7—7 in FIG. 8, of a honeycomb table according to a further embodiment of the invention.
Figure 8:
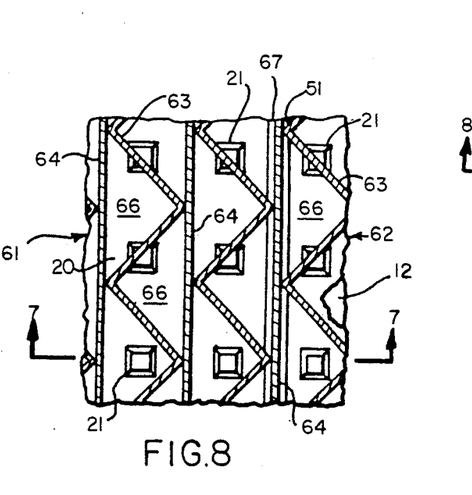
FIG. 8 is a section taken on the line 8—8 in FIG. 7.

The honeycomb table 61 according to the preferred embodiment of the invention shown in FIGS. 7 and 8 is similar in structure and method of manufacture as the honeycomb table shown in FIGS. 1 to 6.

In particular, the honeycomb table 61 has a honeycomb core 62 composed of interconnected first and second elements 63 and 64. The type of honeycomb structure shown in FIGS. 7 and 8 may also be employed in the honeycomb table of FIGS. 1 to 4, and falls in its structural designation under the broad definition of "honeycomb" set forth above or otherwise modernly customary in the trade.

By way of example, the first honeycomb core element 63 may have a wrinkle, pleated, zig-zag, sinusoidal or other corrugated structure.

The first honeycomb core elements 63 are provided between bottoms of the projections 21 and the facing sheet 16. On the other hand, the second honeycomb core elements 64 are extended in between the projections 21 of the sealing sheet 20. In this manner, the second elements 64 are provided from the facing sheet 16 to in between the projections 21.

Accordingly, while the projections 21 project into the honeycomb cells 18 in the embodiment shown in FIGS. 1 to 4, the honeycomb or other cells 66 of the core structure 62 are located below or beyond the projections 21 in the embodiment shown in FIGS. 7 and 8.

In this respect, the honeycomb core 62 or any one or more of its elements may be interconnected with the sealing sheet 20 and/or with its projections 21. In practice, this improves the manufacturing process and renders the resulting clean-room compatible honeycomb tables structurally and dynamically more effective for their vibration isolation and other functions.

For instance, as shown in FIGS. 7 and 8, the first honeycomb core elements 63 may be interconnected with the projections 21 at their bottoms 26.

In the embodiment shown in FIGS. 7 and 8, the first core elements 63 extend below the projections 21 back and forth between the second elements 64. However, it should be understood that the principle disclosed with the aid of FIGS. 7 and 8 is applicable within the scope of the subject invention to other kinds of honeycomb core structures.

End portions of the second elements 64 shown in FIGS. 7 and 8 are attached to the sealing sheet 20 in between the projections 21. For instance, such end portions of the honeycomb core elements 64 may be attached to the above mentioned portions 23 of the sealing sheet 20 between the projections 21.

Alternatively, as shown at 67 in FIG. 7, portions of the second core elements 64 may extend past the sealing sheet or sheets 20 to the table leaf 12 itself, being, for instance, attached to an inside surface 51 thereof.

As also indicated at 67 in FIGS. 7 and 8, the sealing sheet structure may actually be composed of at least two sealing sheets 20 with projections 21. In fact, several of the sealing sheets 20 shown in FIG. 5 may be employed side by side at the inside surface 51 of larger honeycomb tables 12, 61, etc.

In practice, the one or several sealing sheets 20, provided with projections 21, may be provided or employed to reinforce the table leaf 12. Frictional forces between structural members including the table leaf 12, sealing sheet or sheets 20 and honeycomb core structure 62 may be employed to provide damping and improved dynamic performance of the table structure.

These and similar effects may be enhanced by providing damping masses 69 on the sealing sheet 20 in between the projections 21. This refinement may be applied to the embodiment of FIGS. 1 to 4, as well as to the embodiment of FIGS. 7 and 8, for instance. However, as more particularly shown in FIG. 7, the damping masses 69 may be employed as adhesives uniting the extended end portions of the second core elements 64 with, the sealing sheets 20 and its projections 21 and portions 23.

In fact, as shown at 67 in FIG. 7, the damping masses 69 may even be employed for attaching projecting end portions of the second elements 64 to portions of the table leaf 12. There are epoxy and other adhesive fillers that may be employed as damping masses 69. A showing of such damping masses 69 has been omitted from FIG. 8, so as to avoid an obstruction of details of that view.

In practice, each aperture 13 should be covered or sealed at the bottom thereof, by one of the projections 21. Of course, even if an occasional aperture in the table leaf is not so sealed, the table would still be satisfactory in most if not practically all clean-room environments. However, it is greatly preferred that each aperture 13 in the table leaf be sealed off at the bottom thereof by a projection 21 projecting from the sealing sheet or sheets 20.

The projections 21 correspond in number and location at least to the apertures 13. In practice, there may, however, be more projections than there are apertures. In that case, only some of the projections, such as alternate projections 21, would seal off an aperture 13, while the remaining projections would simply extend from solid portions of the table leaf 12 in between apertures 13. By way of example, further projections 21 in addition to those needed for providing clean-room compatibility, may be employed if this is more advantageous in the manufacture of particular honeycomb tables or if this is necessary or desirable to improve the structure and dynamic performance of certain vibration isolation tables.

In this respect, and in general, and as already pointed out on page 5 of the above mentioned 1983-84 Newport Corporation Catalog, 2nd Edition, the rigidity of a honeycomb table or panel is one of the primary performance features, and for a given panel thickness and skin, it depends largely on the shear modulus of the core.

This can be seen by examining the expression for the deflection, δ, of a honeycomb panel simply supported at its ends with a point load in the center:

$$\delta \simeq \frac{PL^3}{24\ EbTH^2} + \frac{PL}{4GHb} \quad (1)$$

wherein:
P = Point load
L = Table length
E = Skin Young's Modulus
b = Table width
T = Skin thickness
H = Table thickness
G = Core shear modulus The first term in this equation is the deflection due to bending and the second term is the deflection due to shear. In most cases, the skin material and panel thickness were the dominant design features, and once specified, it sufficed to make the shear modulus of the core, G, sufficiently large that the shear term is small compared with the bending term. Examination of the bending term shows that this required a much higher shear modulus, G, for panels that are very rigid in bending—i.e., panels that are thick compared to their length, such as with Research Series table tops of the assignee of the entire interest hereof.

The subject invention, while solving the problem of clean-room compatibility, provides the researcher and honeycomb table designer with a tool to improve table structure and performance.

In this respect, the ratio $\delta/P$ derived from equation (1) may be viewed as indicating load-bearing capacity. As already mentioned above in accordance with the subject invention, the structuring of the sheet and projection system 20, 21 may be combined with the structuring of the table leaf and honeycomb system 12, 14, 16 for optimum overall performance in the use of the resulting table system in research, development, testing and other functions.

As already indicated above, the honeycomb core 62 or any one or more of its elements may be interconnected with the sealing sheet 20 and/or with its projections 21 to improve the manufacturing process and render the resulting clean-room compatible honeycomb tables structurally and dynamically more effective for their vibration isolation and other functions. One or several sealing sheets 20, provided with projections 21, may be provided or employed to reinforce the table leaf 12. Frictional forces between structural members including the table leaf 12, sealing sheet or sheets 20 and honeycomb core structure 62 may be employed to provide damping and improved dynamic performance of the table structure.

These and similar effects may be enhanced by providing damping masses 69 on the sealing sheet 20 in between the projections 21.

From these considerations in general, and from equation (1) including factors E, T and G in particular, it may be seen that the sealing sheet 20 with projections 21 in effect performs a load-bearing function. Load, in this respect, may be understood as signifying the factor P in equation (1) or the concept of load in physics, as applied to the illustrated table structures or to other structures within the scope of the subject invention.

Moreover, where the sealing sheet 20 is interposed between the table leaf 12 and the honeycomb core 14, it performs a load-bearing function in the truest sense of the word, bearing not only the table leaf 12 on top of the core 14 and bottom skin 16, but bearing also the load of objects, such as the illustrated object 14 on top of that core structure.

Even projections 21 themselves participate in a load-bearing function. By way of example and not by way of restriction, FIGS. 7 and 8 show projections 21 resting on the above mentioned first honeycomb core elements 63, thereby bearing, on top of those core elements, the load of the table leaf 12 including objects 44 positioned thereon.

Figure 9:
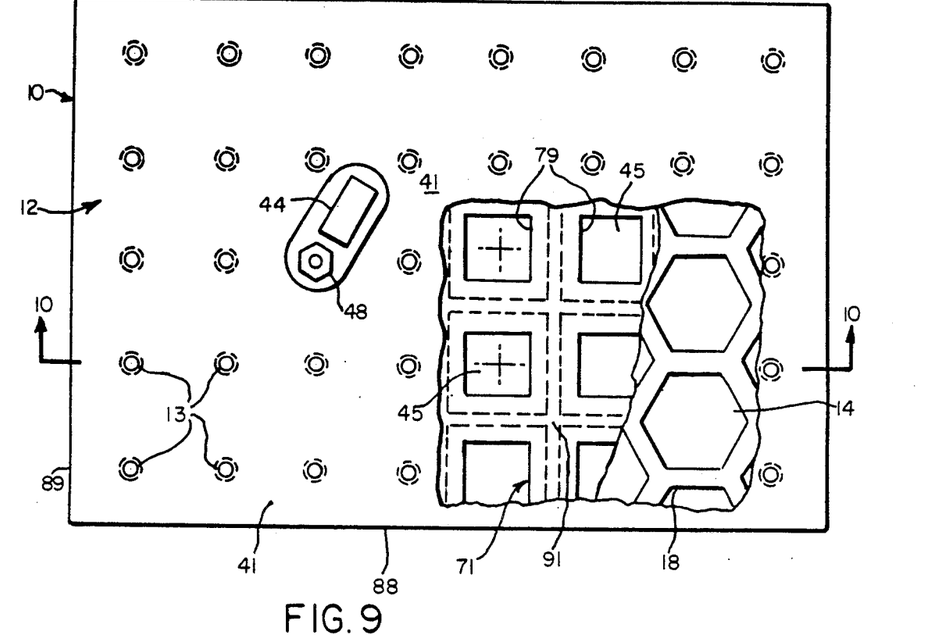
FIG. 9 is a view similar to FIG. 1, having parts broken away to show a load-bearing sealing structure according to a further embodiment of the invention.

FIGS. 9 et seq. show further embodiments according to the subject invention of load-bearing sealing structures.

Figure 10:
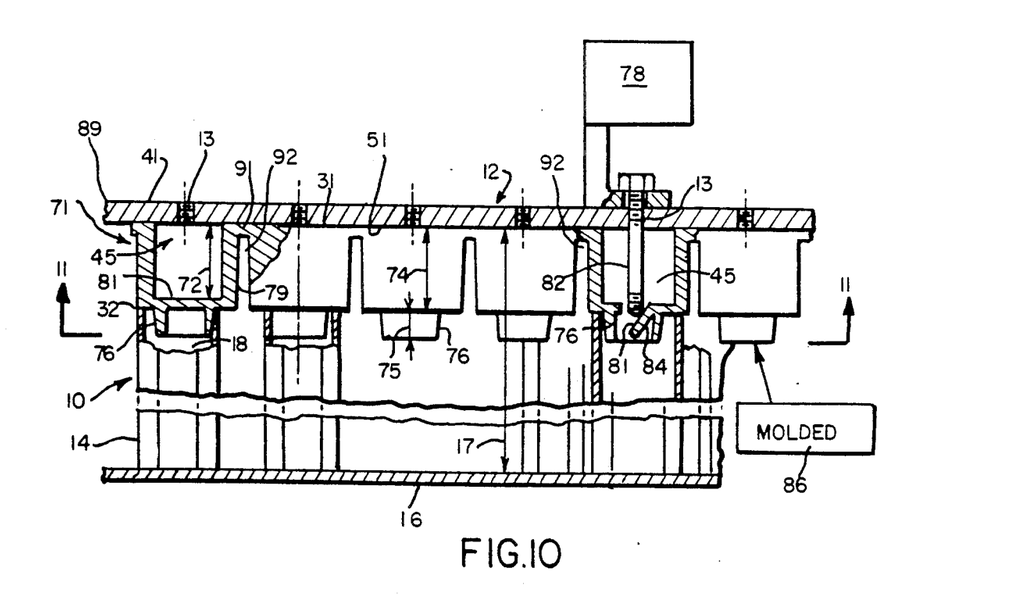
FIG. 10 is a view taken on the line 10—10 in FIG. 9.
Figure 11:
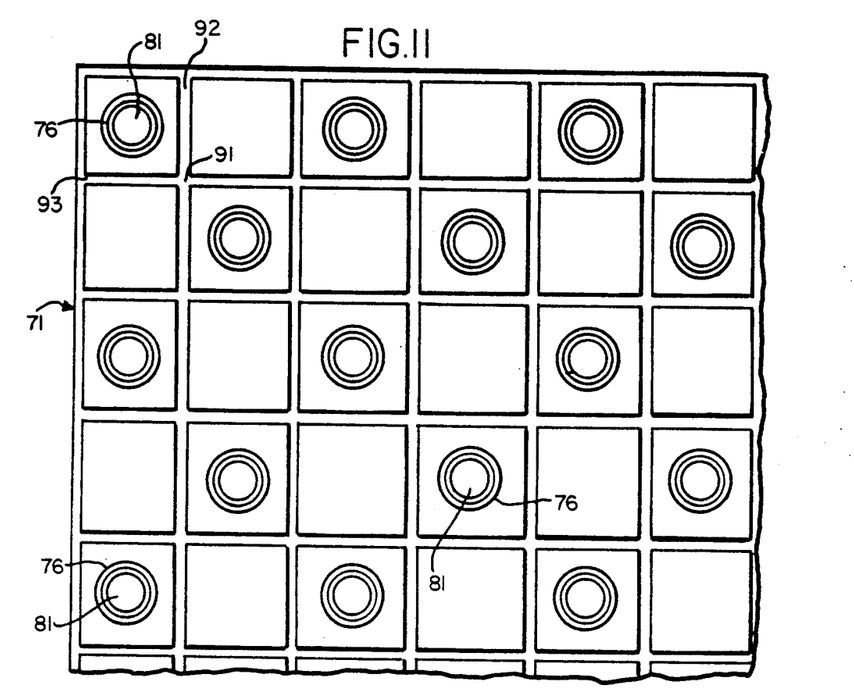
FIG. 11 is a view taken on the line 11—11 in FIG. 10.

In particular, FIGS. 9 to 11 show a load-bearing sealing structure 71 having cavities 45, which, like the cavities 45 of the sealing sheet 20 shown, for instance, in FIG. 4, correspond in number and location at least to the apertures 13 and extend from an inside 51 of the table leaf 12 for a first distance 72 which may be equal or similar to the distance 22 shown in FIG. 4, and which is also several times smaller than the above mentioned first distance 17, which is the spacing between the facing sheet 16 and the table leaf 12.

The sealing structure has a height 74 several times smaller than that spacing between the facing sheet and the table leaf, shown as the first distance 17. The overall height of the sealing structure 71 may be considered to include downward projections 76, with a height 75. However, since these elements 76 project into cells 18 of the honeycomb structure 14, the effective height of the sealing structure, on top of the honeycomb core 14, is actually the height shown at 74.

In particular, the invention interposes the sealing structure between the table leaf 12 and the honeycomb core 14, so that such sealing structure 71 bears the table leaf and loads 44 and 78 imposed on such table leaf.

According to the invention, the sealing structure 71 includes means, such as the walls 79 of the cavities 45, supported by the honeycomb core 14, for bearing the table leaf 12 on top of that honeycomb core and for bearing loads imposed by objects 44 and 78 on the table leaf.

It may be recalled in this respect that the above mentioned Heide U.S. Pat. No. 4,645,171 teaches the use of non-load-bearing enclosures 24 for clean-room compatibility purposes. By sharp contrast thereto, the sealing structures 20 and 71 according to the subject invention, and even the cavity enclosures 79, are load bearing as herein shown and taught.

The sealing structure 71 and the table leaf 12 are attached to each other, such as with an adhesive 31 applied to the sealing structure and to an inside surface 51 of the table leaf, opposite the outside 41 thereof.

Similarly, the sealing structure and the honeycomb core are attached to each other with an adhesive 32 applied to that sealing structure 71 and to the honeycomb core 14. In particular, the sealing structure and the honeycomb core 14 may be attached to each other at portions of that sealing structure 71 located at the cavities 45. The sealing structure and the table leaf 12 may be attached to each other at portions of the sealing structure between the cavities 45.

According to a preferred embodiment of the subject invention, the sealing structure 71 is used as an intermediary in an attachment of the honeycomb core 14 to the table leaf 12. The cavities 45 are sealed, except for their communication through the table top apertures 13, through which they may be cleaned, if and when necessary for clean-room compatibility. The cavities 45 are provided with closed sides and closed bottoms relative to the honeycomb core 14 or its internal cells 18.

As an exception to that general principle of the subject invention, an embodiment thereof provides the sealing structure 71, at the bottom of each cavity 45 communicating with an aperture in the table leaf, with a break-out 81 aligned with that aperture 12, to permit a fastener 82 extending through that aperture 13 and that cavity 45 to break through the sealing structure 71 without damage to the sealing structure and the honeycomb core.

In particular, FIG. 10 shows at 84 a break-out 81 broken out at least partially by a fastening bolt 82 which, below the table leaf 12, is longer than the depth of the cavity 45. Such a breakout 84 is an exception to the general sealing of the cavities 45 except for communication through the apertures 13, and the sealing of such apertures and cavities relative to the cells 18 of the honeycomb structure 14. However, such an occasional breakout 84 is like a safety fuse, in that it prevents long bolts 82 from separating the table leaf 12 and sealing structure 71 from each other and from even damaging the core 14. In other words, an occasional breakout, such as shown at 84 in FIG. 10, is tolerated in the interest of preserving the overall integrity of the integral table leaf, sealing and core structures or, in other words, of the overall table structure 10.

According to a preferred embodiment of the invention, the sealing structure 71 is provided with projections 76 extending into cells 18 of the honeycomb core 14. For one thing, these downward projections 76 aid in a relative alignment of the honeycomb core 14, internal cells 18, sealing structure 71, cavities 45, table leaf 12 and apertures 13 in the manufacture of the table structure 10.

Moreover, the projections 76 reinforce a periphery of the break-out 81 with a hollow projection. Put differently, the projections 76 extend around break-outs 81 in the sealing structure 71 aligned with apertures 13 to permit a fastener 82 extending through such an aperture and the corresponding cavity 45 to break through the sealing structure, as shown at 84 in FIG. 10, without damage to the sealing structure 71 and honeycomb core 14, or without damage to the integrity of the table structure, for that matter.

Other than such occasional breakouts 84, the principle according to the subject invention prevails, that the cavities 45 have closed sides 79 and closed bottoms relative to the internal cells 18 of the honeycomb core.

As shown by the block 86 in FIG. 10, the sealing structure 71 may be molded from a sheet of sealing material. For instance, a flat sealing sheet, similar to the sealing sheet 20 without projections 21, may be provided and the sealing structure 71 and cavities 45 may be molded from such a sheet of sealing material, such as by vacuum drawing. Other methods of making the sealing structure 71 include an injection molding thereof. The sealing structure 71 may, for example, consist of a molded sheet of sealing material which has been given the desired configuration.

The cavities 45 may be provided with a predetermined or desired configuration. For instance, where the internal cells 18 have a first cross-sectional configuration, the cavities 45 may be provided with a second cross-sectional configuration different from that first configuration. By way of illustrated preferred embodiment of the invention, the cavities 45 are provided with a rectangular cross-section.

As seen particularly well in FIG. 9, sides or walls 79 of the cavities 45 of the sealing structure 71 are arranged or extend in parallel to sides 88 and 89 of the table leaf 12. This is also the case with the embodiment shown in FIGS. 12 and 13, more fully described below.

However, reverting to the embodiment shown in FIGS. 9 to 11, the sealing structure of that embodiment is provided with a top sheet 91 having upper portions of the cavities 45 extending therethrough, and the sealing structure 71 is rendered flexible by providing a multitude of slots 92 and 93 extending between the cavities 45 to the top sheet 91. Put differently, these slots extend from the top sheet 91 right through the bottom of the sealing structure 71.

Within the scope of the invention, only one set of slots need to be provided. For instance, slots 92 may be provided in parallel to the table side 98, as seen in FIG. 10. However, the preferred embodiments according to FIGS. 11, 13 and 14 provide a pattern of crossed slots 92 and 93 having the cavities 45 located therebetween or therein between.

In the case of the embodiment seen in FIG. 11, the crossed slots 92 and 93 extend through the bottom region of the sealing structure 71. This is also the case in the embodiment shown in FIG. 14, as seen from the dotted lines at 92 and 93 therein. However, that embodiment may be in that respect more like the embodiment shown in FIGS. 12 and 13, if required for a certain damping or other effect.

Figure 12:
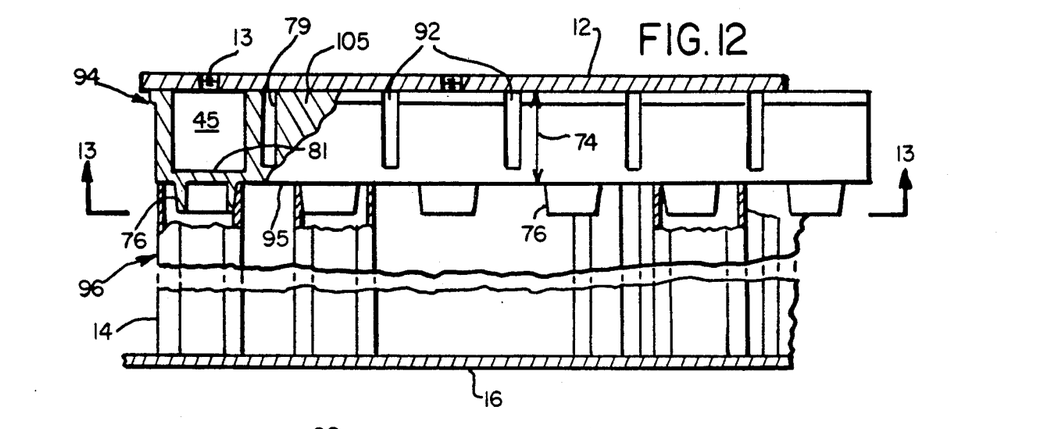
FIG. 12 is a view similar to FIG. 10 showing another embodiment of the invention.
Figure 13:
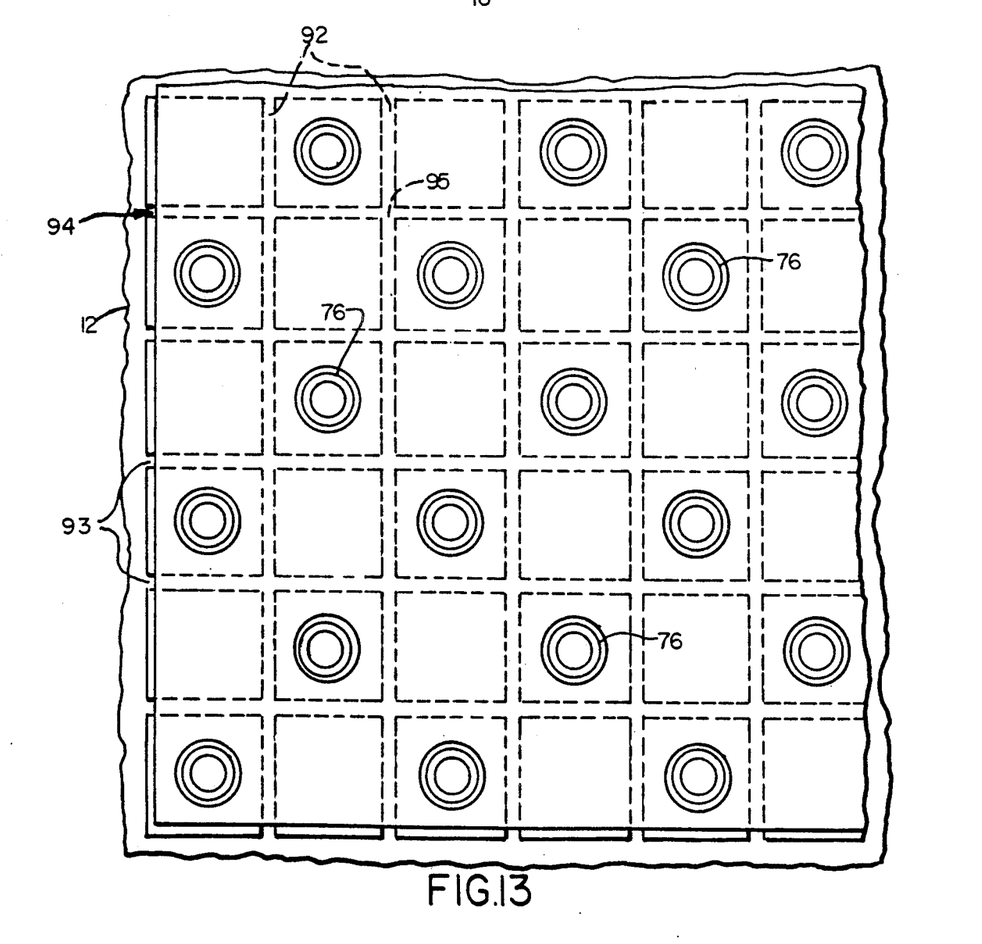
FIG. 13 is a view taken on the line 13—13 in FIG. 12.

In particular, the embodiment shown in FIGS. 12 and 13 provides its sealing structure 94 with a bottom sheet 95 extending in this case in parallel to the table leaf 12, but at a distance thereto corresponding approximately to the height 74 of that sealing structure, which corresponds to the sealing structure 71 shown in FIGS. 10 to 11.

The sealing structure 94 is rendered flexible by providing again a multitude of slots extending between the cavities 45 to the bottom sheet 95. By way of example, there again may be a pattern of crossed slots 92 and 93 having the cavities 45 located therebetween. However, this time the crossed or other slots 92 and 93 extend to the bottom sheet 95. Put differently, it may be said that the slots 92 and 93 extend from the bottom sheet 95 of the sealing structure 94 directly to the table top or leaf 12 or to an adhesive or the like located at the underside 51 thereof.

The remainder of the sealing structure 94 shown in FIGS. 12 and 13 may be the same as the sealing structure 71 shown in FIGS. 9 to 11, and identical or similar adhesives and other techniques may be employed for unifying the intermediary sealing structure 94 into a table structure 96 together with the apertured table leaf 12, core 14 and bottom sheet 16.

The same essentially applies to the sealing structure 98 shown in FIG. 14. The cavities 45 again may be provided with, or have, a rectangular cross-section. However, according to the embodiment shown in FIG. 14, the sides of the cavities 45 are arranged at angles to the sides 88 and 89 of the table leaf 12. Put differently, diagonals 100 and 101 of the rectangular cavities 45 are parallel to sides of the table leaf 88 and 89, respectively.

As the embodiment shown in FIGS. 9 to 11, the embodiment shown in FIG. 14 provides its sealing structure with a top sheet 91 through which the cavities 45 extend toward or to the table leaf 12. In that case, the slots 92 and 93 would extend through the bottom region of the sealing structure 98.

However, within the scope of the invention, the diagonally extending sealing structure 98 may be realized by providing that sealing structure with a closed bottom sheet, as shown at 95 in FIGS. 12 and 13. In that case, the slots 92 and 93 would extend from that closed bottom right through the top of the sealing structure 98, and to the table leaf 12, as do the slots 92 and 93 in the embodiment of FIGS. 12 and 13. The sealing structure 98 may also be provided with projections 76 and cutouts 81 and may in other respects be like the other embodiments, except as expressly noted to the contrary herein.

The subject invention, and even the illustrated embodiments thereof, provide the table designer, researcher, developer and manufacturer with a wide variety of sealing structures to choose from.

For one thing, it should be recalled at this point that the core 14 need not necessarily have a hexagonal honeycomb configuration, but may be of a wrinkle, pleated, zig-zag, sinusoidal or other corrugated structure, inasmuch as the expression "honeycomb" has acquired a secondary meaning in optical table construction and related areas, covering all kind of structures, in addition to the original honeycomb configuration.

Accordingly, depending on the actual structure and configuration of a "honeycomb" core, the table designer and the manufacturer may find it more advantageous to employ a diagonally arranged sealing structure, such as the structure 98 shown in FIG. 14, rather than the rectilinearly arranged sealing structures 71 and 94 of FIGS. 9 to 12. In addition or alternatively, the table developer or designer may prefer the diagonally arranged sealing structure 98 for specific load-bearing properties, in combination with a given overall table structure or desired operation.

Of course, the converse could be true in a given situation, and it should be remembered that the load-bearing properties of a sealing structure in the subject context not only concern the ability to carry the weight of the table leaf 12 and of whatever objects may be mounted thereon, but additionally or alternatively, concern the load-bearing implications of equation (1) set forth above, and of its derivatives.

In this respect and in general, it may be noted that sealing structures as herein disclosed may have more cells than there are mounting apertures 13 in the table leaf 12. For instance, FIG. 14 shows cells 103 of the sealing structure 98 which doe not coincide with any of the apertures 13. Other cells of the sealing structure 98, that coincide with mounting apertures 13 are provided with the above mentioned cavities 45. However, cells 103 that do not coincide with any mounting aperture, need not be provided with cavities. For instance, if the sealing structure has a top sheet 91 as in FIGS. 9 to 11 and 14, the cavities 45 need only extend through such top sheet where any mounting hole 13 in the table leaf 12 is located. At other portions of the sealing structure, the top sheet 91 may be solid, such as at the locations 103, where no mounting hole 13 is located.

Similarly, where the sealing structure is provided with a bottom sheet 95, no cavities need be provided at portions of the sealing structure 94 where there is no corresponding aperture 13. By way of example, FIG. 12 shows a solid element 105 for the sealing structure 94 where no mounting aperture 13 is located in the table leaf 12.

In the context of the sealing structures herein disclosed, solid elements interdigitated or otherwise mixed with cavity-containing elements may be beneficial to the load-bearing function in a broad sense, or to other perimeters of table manufacture and performance. For the same reason, it is within the scope of the subject invention to provide cavities 45 in the sealing structures 20, 71, 94 and 98, even where there are no coincident mounting apertures 13 in the table leaf. Again, this gives the researcher, developer, table designer and manufacturer a variety of alternatives to choose from for best table configuration and performance for all kind of purposes and applications.

As already disclosed in the Terry et al Pat. Application No. 06/663,343, filed Oct. 22, 1984, to which the subject patent application goes back under 35 USC 120, and as shown in its resulting Terry et al U.S. Pat. No. 4,621,006, the drawings and other disclosure of which are herewith incorporated by reference herein, an aspect of the invention resides in a honeycomb table comprising, in combination a table leaf 12 having an outside surface 41, a pattern of mounting holes 13 in that table leaf, a facing sheet 16 spaced from that table leaf, a honeycomb core 14 supporting that table leaf and extending inside that table leaf between that apertured table leaf and that facing sheet 16 and having internal cells 38 between the table leaf and that facing sheet, and means for rendering that honeycomb table clean-room compatible, including sealing structure 25 extending continuously inside that table leaf for sealing off the internal cells 38 against the mounting holes 13 in the table leaf throughout said pattern. As can be seen from FIG. 1 of that Terry et al U.S. Pat. No. 4,621,006, the latter pattern includes at least forty mounting holes sealed off by the sealing structure 25. The same applies to FIG. 1 of the subject patent application, which was FIG. 1 of its above mentioned parent U.S. Pat. application No. 06/890,632, and to the embodiments of FIGS. 9 to 14 of the subject patent application.

These and various other aspects, embodiments, modifications and variations within the spirit and scope of the subject invention or equivalents thereof are apparent or will suggest themselves to those skilled in the art from the subject extensive disclosure.

We claim:

1. A honeycomb table, comprising in combination:
   a table leaf having an outside surface and apertures for receiving fasteners for attaching objects at said outside surface;
   means for rendering said honeycomb table clean-room compatible, including a sealing sheet having projections corresponding in number and location at least to said apertures and extending from an inside of said table leaf for a first distance;
   a facing sheet spaced from said table leaf; and
   a honeycomb core supporting said sealing sheet and said table leaf and extending between said sealing sheet and said facing sheet for a second distance being larger than said first distance and having internal cells between said sealing sheet and said facing sheet sealed off against said apertures by said sealing sheet.

2. A honeycomb table as claimed in claim 1, wherein: said projections project into said internal cells.

3. A honeycomb table as claimed in claim 2, wherein: said projections are sealed except for communication through said apertures.

4. A honeycomb table as claimed in claim 2, wherein: said projections have closed sides and closed bottoms relative to said internal cells.

5. A honeycomb table as claimed in claim 2, including:
   means for attaching said sealing sheet and said table leaf to each other at portions of said sealing sheet between said projections.

6. A honeycomb table as claimed in claim 5, including:
   means for attaching said sealing sheet and said honeycomb core to each other at portions of said sealing sheet between said projections.

7. A honeycomb table as claimed in claim 1, including:
   means for attaching said sealing sheet and said honeycomb core to each other at portions of said sealing sheet between said projections.

8. A honeycomb table as claimed in claim 1, wherein: said internal cells have a first cross-sectional configuration; and said projections project into said internal cells and have a second cross-sectional configuration different from said first configuration.

9. A honeycomb table as claimed in claim 1, wherein:
said internal cells have a hexagonal configuration; and
said projections project into said internal cells and have a cross-sectional configuration different from a hexagonal configuration.

10. A honeycomb table as claimed in claim 1, wherein:
said projections are tapered.

11. A honeycomb table as claimed in claim 1, including:
damping masses on said sealing sheet in between said projections.

12. A honeycomb table, comprising in combination:
a table leaf having an outside surface and apertures for receiving fasteners for attaching objects at said outside surface;
means for rendering said honeycomb table cleanroom compatible, including a sealing sheet having projections corresponding in number and location at least to said apertures and extending from an inside of said table leaf;
a facing sheet spaced from said table leaf; and
a honeycomb core supporting said sealing sheet and having first elements between bottoms of said projections and said facing sheet, and second elements interconnected with said first elements and extending along said first elements and in between said projections.

13. A honeycomb table as claimed in claim 12, including:
means for attaching end portions of said second elements to said sealing sheet in between said projections.

14. A honeycomb table as claimed in claim 12, wherein:
said first elements extend below said projections back and forth between said second elements.

15. A honeycomb table, comprising in combination:
a table leaf having an outside surface and apertures for receiving fasteners for attaching objects at said outside surface;
means for rendering said honeycomb table cleanroom compatible, including a load-bearing sealing structure having cavities corresponding in number and location at least to said apertures and extending from an inside of said table leaf for a first distance;
a facing sheet spaced from said table leaf; and
a honeycomb core supporting said sealing structure and said table leaf and extending between said sealing structure and said facing sheet for a second distance being larger than said first distance and having internal cells between said sealing structure and said facing sheet sealed off against said apertures by said sealing structure;
said sealing structure including means supported by said honeycomb core for bearing the table leaf on top of the honeycomb core and for bearing loads imposed by said objects on said table leaf.

16. A honeycomb table as claimed in claim 15, wherein:
said load-bearing sealing structure has projections projecting into said internal cells.

17. A honeycomb table as claimed in claim 15, wherein:
said projections extend around break-outs in the sealing structure aligned with said apertures to permit a fastener extending through an aperture and a corresponding cavity to break through said sealing structure without damage to the sealing structure and honeycomb core.

18. A honeycomb table as claimed in claim 15, wherein:
said sealing structure has break-outs aligned with said apertures to permit a fastener extending through an aperture and a corresponding cavity to break through said sealing structure without damage to the sealing structure and honeycomb core thereof.

19. A honeycomb table as claimed in claim 15, wherein:
said cavities have closed sides and closed bottoms relative to said internal cells.

20. A honeycomb table as claimed in claim 15, including:
means for attaching said sealing structure and said table leaf to each other at portions of said sealing structure between said cavities.

21. A honeycomb table as claimed in claim 20, including:
means for attaching said sealing structure and said honeycomb core to each other at portions of said sealing structure located at said cavities.

22. A honeycomb table as claimed in claim 15, including:
means for attaching said sealing structure and said honeycomb core to each other at portions of said sealing structure located at said cavities.

23. A honeycomb table as claimed in claim 15, wherein:
said internal cells have a first cross-sectional configuration; and
said cavities have a second cross-sectional configuration different from said first configuration.

24. A honeycomb table as claimed in claim 15, wherein:
said sealing structure consists of a molded sheet of sealing material.

25. A honeycomb table as claimed in claim 15, wherein:
said cavities are of rectangular cross-section.

26. A honeycomb table as claimed in claim 25, wherein:
sides of said cavities are parallel to sides of the table leaf.

27. A honeycomb table as claimed in claim 25, wherein:
diagonals of said rectangular cavities are parallel to sides of the table leaf.

28. A honeycomb table as claimed in claim 15, wherein:
said sealing structure at the bottom of each cavity communicating with an aperture in the table leaf has a break-out aligned with that aperture, to permit a fastener extending through that aperture and that cavity to break through said sealing structure without damage to a sealing structure and honeycomb core interface.

29. A honeycomb table as claimed in claim 28, including:
hollow reinforcements extending around peripheries of break-outs and projecting into said internal cells of the honeycomb core.

30. A honeycomb table as claimed in claim 15, wherein:

said sealing structure has projections extending said into internal cells of the honeycomb core.

31. A honeycomb table as claimed in claim 15, wherein:

said sealing structure has a bottom sheet; and a multitude of slots extending between said cavities to said bottom sheet.

32. A honeycomb table as claimed in claim 15, wherein:

said sealing structure has a bottom sheet; and a pattern of crossed slots having said cavities located therebetween.

33. A honeycomb table as claimed in claim 15, wherein:

said sealing structure has a top sheet having upper portions of said cavities extending therethrough; and a multitude of slots extending between said cavities to said top sheet.

34. A honeycomb table as claimed in claim 15, wherein:

said sealing structure has a top sheet having upper portions of said cavities extending therethrough; and a pattern of crossed slots having said cavities located therebetween and extending through a bottom region of said sealing structure.

35. A honeycomb table, comprising in combination:

a table leaf having an outside surface;

a pattern of mounting holes in said table leaf;

a facing sheet spaced from said table leaf;

a honeycomb core supporting said table leaf and extending inside said table leaf between said apertured table leaf and said facing sheet and having internal cells between said table leaf and said facing sheet; and means for rendering said honeycomb table cleanroom compatible, including sealing structure extending continuously inside said table leaf for sealing off said internal cells against said mounting holes in said table leaf throughout said pattern.

36. A honeycomb table as claimed in claim 35, wherein:

said pattern includes at least forty mounting holes sealed off by said sealing structure.

37. A honeycomb table, comprising in combination:

an apertured table leaf having apertures through an outside surface;

a facing sheet spaced from a said table leaf;

a honeycomb core supporting said table leaf and extending inside said table leaf between said apertured table leaf and said facing sheet and having internal cells between said table leaf and said facing sheet; and means for rendering said honeycomb table cleanable through said apertures.

38. A table as claimed in claim 37, wherein:

said apertures include at least forty mounting holes.

39. A table as claimed in claim 37, wherein:

said apertures include a multitude of mounting holes arranged in a grid pattern.

40. A honeycomb table, comprising in combination:

an apertured table leaf having apertures through an outside surface;

a facing sheet spaced from a said table leaf;

a honeycomb core supporting said table leaf and extending inside said table leaf between said apertured table leaf and said facing sheet and having internal cells between said table leaf and said facing sheet; and means for rendering said honeycomb table cleanroom compatible including a shallow region within said cells which seals off each aperture from said core.

41. A honeycomb table as claimed in claim 40, wherein:

said apertures include at least forty mounting holes.

42. A honeycomb table as claimed in claim 40, wherein:

said apertures include a multitude of mounting holes arranged in a grid pattern.

43. A honeycomb table, comprising a combination a table leaf having an outside surface;

a pattern of mounting holes in said table leaf;

a facing sheet spaced from said table leaf;

a honeycomb core for said table leaf extending inside said table leaf between said apertured table leaf and said facing sheet and having internal cells between said table leaf and said facing sheet; and a sealing sheet between said table leaf and said internal cells of the honeycomb core, said sealing sheet defining cavities sealed except for communication through said mounting holes, and slots extending between said cavities.

44. A honeycomb table as claimed in claim 43, wherein:

said cavities have closed sides and closed bottoms relative to said honeycomb core.

45. A honeycomb table as claimed in claim 44, wherein:

said cavities have a configuration different from a configuration of said internal cells.

46. A honeycomb table as claimed in claim 44, including:

a bottom sheet extending at a distance to said table leaf corresponding approximately to the height of a sealing structure of said sealing sheet, parallel to said table leaf, said slots extending from said bottom sheet.

* * * * *